Patented July 23, 1929.

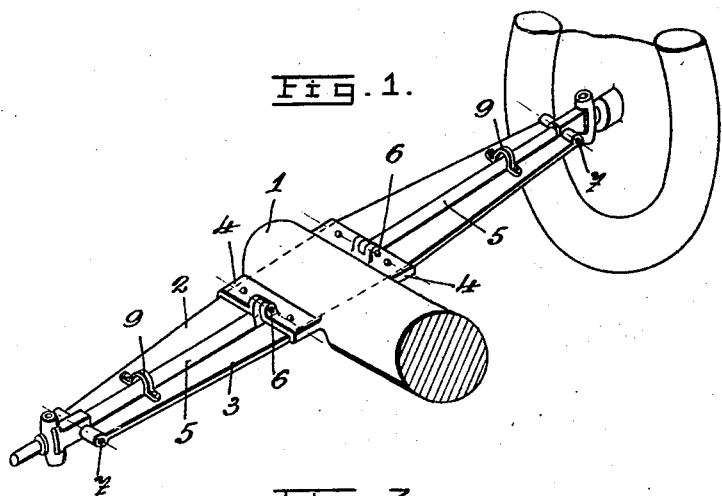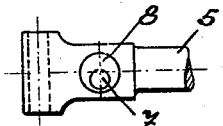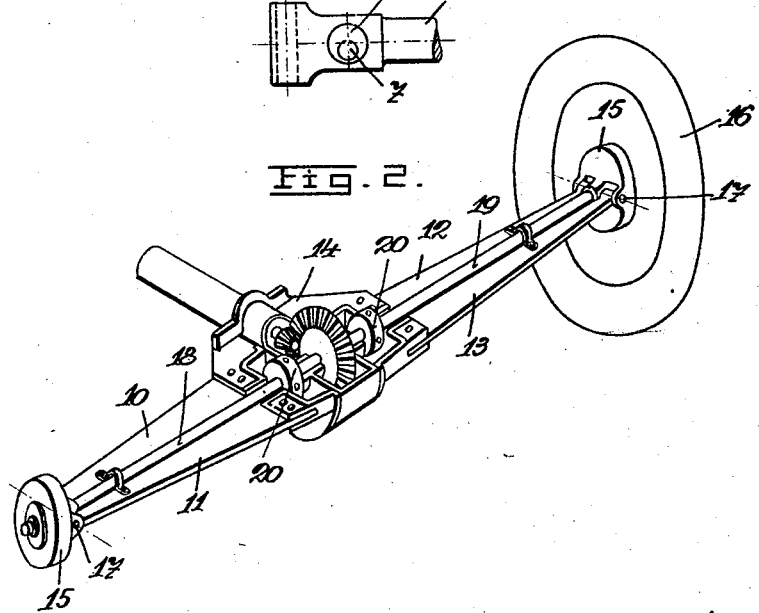

1,722,206

UNITED STATES PATENT OFFICE.

WILLIBALD GATTER, OF AUSSIG-SCHRECKENSTEIN, CZECHOSLOVAKIA.

VEHICLE AXLE.

Application filed March 22, 1928, Serial No. 263,793, and in Austria January 20, 1926.

The endeavour to effect the support of the tiltable shafts of vehicles, which is necessary in the case of a wide gauge, in a simple manner led to the present invention which consists substantially in not making the yielding members of composite leaf springs as heretofore, but of single leaf springs. The great width of the single leaf springs thus made possible, which lie edge-on in the direction of the driving resistance, enables the driving resistance to be taken up with great reliability and the tiltable axle itself to be made relatively light. As these springs lie practically over their entire length in the horizontal plane passing through the two wheel centres, they are subjected only to the ordinary bending stresses due to the springing motion, while the forces acting on them in the direction of the driving resistance are very small and may be left out of account.

In the accompanying drawing two constructional examples of the new arrangement are shown, Fig. 1 showing the arrangement in perspective view as applied to the front axle, Fig. 2 a similar view of the arrangement as applied to the driving axle and Fig. 3 a detail in section illustrating the manner in which the spring pin is journalled in the head of the tiltable shaft.

In the constructional example shown in Fig. 1 two single-leaf springs 2, 3 which lie one behind the other in the direction of the driving resistance are fixed rigidly by means of the flanges 4 to the body 1 of the vehicle which is to be sprung. The springs extend right through the body 1 of the vehicle. Between them lie the tiltable shafts 5 each of which tilts about the pivot 6 and supports the road wheel at its outer end. The outer ends of the springs 2, 3 are each connected by a pin 7 which is journalled eccentrically in a bush 8 in the outer end of the tiltable shaft (Fig. 3). For stiffening the two springs 2, 3 with respect to one another connecting bridges 9 are provided.

In the arrangement shown in Fig. 2 four single-leaf springs 10, 11 and 12, 13 are arranged in pairs between the gear box 14 and the brake drums 15 of the wheels 16. The inner ends of the springs are fixed to flanges on the gear box and the outer ends are each connected by a bolt 17 which is journalled in an eccentric bush (similar to that bearing the reference 8) on the brake drum lugs. The driving shaft portions 18, 19 lie between the springs 10, 11 and 12, 13 respectively. Their inner ends are connected by universal joints 20 to the change speed gear, their outer ends being rigidly connected to the wheels and brake drums.

What I claim is:

1. In a vehicle the combination with shafts for the road wheels pivoted at one end to the vehicle body, so as to be capable of tilting with respect to the body and being adapted to receive a road wheel at the opposite end of single-leaf springs arranged one on each side of said shafts and connected to the shafts at the ends thereof adjacent the wheels and to the frame of the vehicle intermediately of the ends of the shafts so as to lie edge-on in the direction of travel of the vehicle, said springs being capable alone of resisting the horizontal forces acting on the shafts as well as the vertical forces, as and for the purposes set forth.

2. In a vehicle, the combination with shafts for the road wheels pivoted at one end to the vehicle body so as to be capable of tilting with respect to the body and being adapted to receive a road wheel at the opposite end of single-leaf springs arranged one on each side of said shafts and connected to the shafts at the ends thereof adjacent the wheels and to the frame of the vehicle intermediately of the ends of the shafts so as to lie edge-on in the direction of travel of the vehicle positioned with respect to the shafts so as to be intersected by a horizontal plane passing through the centres of the road wheels, said springs being capable alone of resisting the horizontal forces acting on the shafts as well as the vertical forces, as and for the purposes set forth.

3. In a vehicle, the combination as set forth in claim 1, in which the single-leaf springs on each side of the shafts extend in one piece right across the vehicle, as and for the purposes set forth.

4. In a vehicle, the combination with shafts for the road wheels pivoted at one end to the vehicle body so as to be capable of tilting with respect to the body and being adapted to receive a road wheel at the opposite end of single-leaf springs arranged one on each side of said shafts and connected to the frame of the vehicle intermediately of the ends of the shafts so as to lie edge-on in the direction of travel of the vthicle, said springs being capable alone of resisting the horizontal forces acting on the shafts as well as the vertical forces, pins passed through the ends of said springs adjacent the wheels so as to hold said ends together, bushes in the ends of the shafts adjacent the wheels and eccentric bores in said bushes, said pins being inserted in said eccentric bores, as and for the purposes set forth.

In testimony whereof I have signed my name to this specification.

WILLIBALD GATTER.